J. B. MERWIN.
SIGNAL FOR MOTOR VEHICLES.
APPLICATION FILED SEPT. 2, 1916.
1,351,260.
Patented Aug. 31, 1920.
2 SHEETS—SHEET 1.
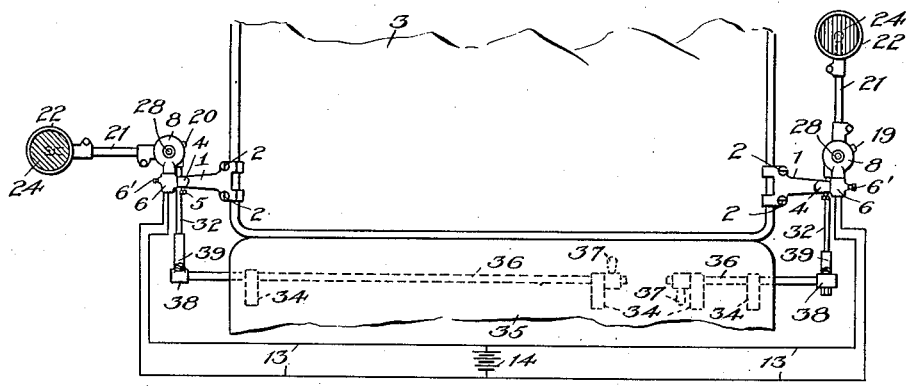
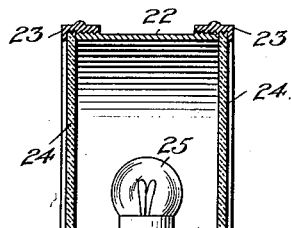
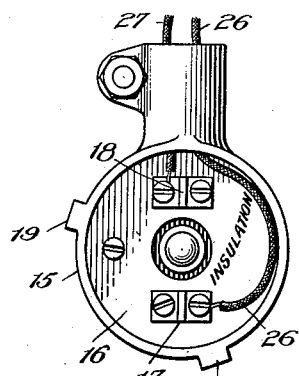
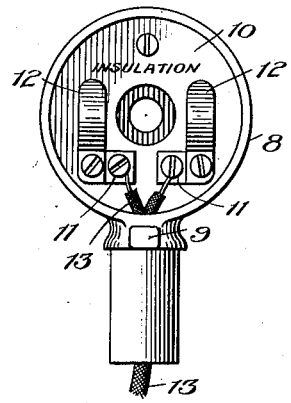

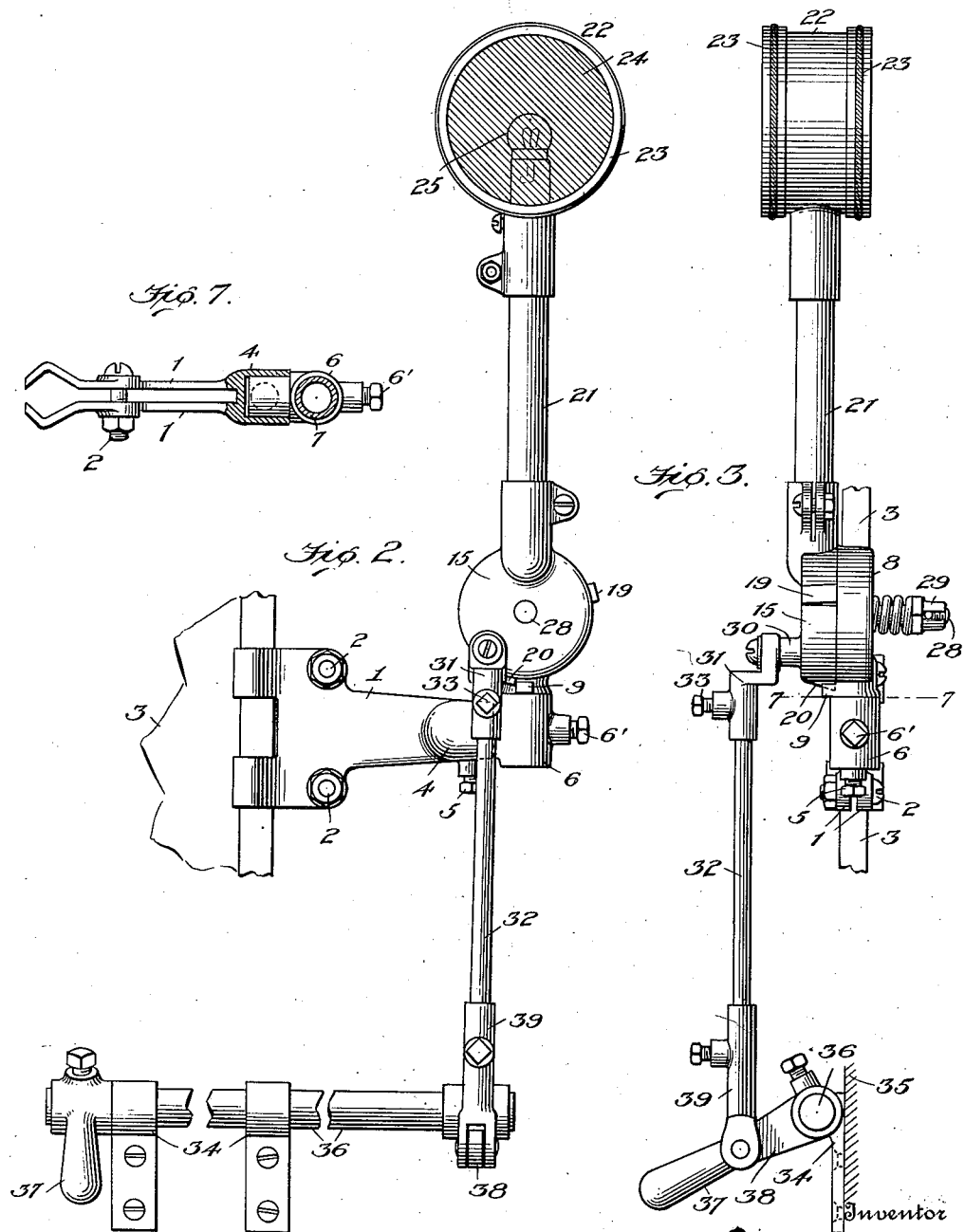

UNITED STATES PATENT OFFICE.

JOSEPH B. MERWIN, OF LINCOLN, NEBRASKA.

SIGNAL FOR MOTOR-VEHICLES.

1,351,260.  Specification of Letters Patent.  Patented Aug. 31, 1920.

Application filed September 2, 1916. Serial No. 118,263.

*To all whom it may concern:*

Be it known that I, JOSEPH B. MERWIN, a citizen of the United States, residing at Lincoln, in the county of Lancaster and State of Nebraska, have invented certain new and useful Improvements in Signals for Motor-Vehicles; and I do hereby declare the following to be a full, clear, and exact description of the invention, such as will enable others skilled in the art to which it appertains to make and use the same.

My invention relates to signals, more especially to automatic semaphoric signals for use upon moving vehicles such as automobiles, motor trucks, motor cycles, power boats, aeroplanes and other power driven conveyances capable of developing more or less speed.

This invention has for its primary object the safe-guarding of human lives and limbs.

As a further object it contemplates and provides for the production of signals of the class indicated, capable of use either at night or in the day time, in darkness or in light. A signal which can be read and understood equally well either in front of or in the rear of a vehicle, upon which it is mounted. A signal including signaling apparatus and connections, operable either by hand or by foot power with speed, accuracy and precision.

A further object of the present invention is the production of apparatus possessing the characteristics above indicated, which apparatus is at once designed, arranged and adapted for convenient and easy attachment to wind shields of automobiles or similar conveyances; and which, because of its extreme simplicity, is not likely to become deranged or to get out of order.

With the foregoing and other objects and advantages in view the invention may be said to reside in the novel construction, combination and arrangement of parts shown, or their mechanical equivalents, as hereinafter particularly described, and pointed out in the claims following.

In the accompanying drawings which form part of this application for Letters Patent, and whereon corresponding numerals refer to like parts in the several views:

Figure 1 is a fragmentary view of an automobile wind shield and instrument board or dash-board, illustrating in front elevation my invention as applied to a wind shield, and showing certain electrical connections diagrammatically.

Fig. 2 is a rear elevation of the present invention upon a relatively enlarged scale.

Fig. 3 is a side elevation of parts shown by Fig. 2.

Fig. 4 is a vertical central section through a target-lantern, a joint coupling, and intervening semaphoric signal arm, with inclosed electrical connections in full lines.

Figs. 5 and 6 are detached fragmentary views showing in plan the meeting faces of a joint coupling, and, Fig. 7 is a horizontal section taken on the line 7—7 of Fig. 3, showing also in plan one form of attaching bracket for securing the invention to a vertical support such as the side frame of a wind-shield.

In the outstart it should be understood that signals of the character indicated are used upon both sides of a vehicle, as illustrated by Fig. 1 of the drawings. Except for the fact that the operating connections of these signals are right and left handed respectively, and that different colored glasses are employed, they do not differ structurally, and for that reason, but one signal and one set of operative connections will be hereinafter described, such description being applicable to either or both.

Reference being had to the drawings and numerals thereon, 1 indicates a supporting bracket having a bifurcated clutch, and screws 2, 2, for binding and securing same to a suitable support such as the side frame of an automobile wind-shield 3, as shown by Fig. 1. In the outer end of bracket 1 is formed a tubular socket 4 provided with a set screw 5, and into the said socket is fitted the shank of a T coupling which may be held against rotation by engagement of said set screw 5. The hollow tubular head 6 of said T coupling is also provided with a set screw 6' and receives the depending hollow shank 7 of a relatively fixed cup-shaped member 8, constituting one half of a joint coupling which, in turn, is provided upon its lowermost edge with a fixed stop 9, and is held against horizontal rotation by agency of the said set screw 6'.

This cup shaped member 8 is equipped with a centrally perforated insulating disk 10, bearing upon its inner face suitable binding posts 11, 11, and spring terminals 12, 12, for electric wires 13, leading from a suitable electric battery, diagrammatically shown at 14 in Fig. 1, through the hollow shank 7 aforesaid, to both binding posts 11, 11, and their respective terminals 12, 12.

Mating with the relatively fixed member 8 of said joint coupling is a similar cup shaped rotatable member 15, also equipped with a centrally perforated bottom disk 16, from which project contacts 17, 18, as shown by Figs. 4 and 5. Upon the periphery of the said joint member 15 are limit lugs 19 and 20 for alternate engagement with the fixed stop 9 aforesaid, as will later appear, and radiating from the said rotatable joint member 15 is a tubular signal arm 21, carrying upon its outer end a signal lantern or target 22, preferably of cylindrical form, and provided upon each end with flanged screw threaded glass-retaining rings 23, 23, between which and the edges of the lantern casing are secured glasses 24 and 24, preferably colored, as will later be explained. Within lantern 22 is located an incandescent lamp 25 of any approved construction, electrically connected by wires 26 and 27 passing through the tubular arm 21 to contacts 17 and 18, respectively, in the joint member 15, as clearly shown by Fig. 4.

As best shown by Fig. 4 also, the said joint coupling members 8 and 15 are connected by means of a centrally positioned screw 28, a spring surrounding said screw and bearing upon the outer face of member 8 and a tension nut 29 for holding the coupling members firmly together. From the opposite side of the said joint coupling, or the rear face of the rotatable coupling member 15, and at right angles thereto, is provided a wrist pin 30 upon which is loosely journaled a bayonet coupling 31 having a short depending sleeve within which is mounted the upper end of a vertical operating rod 32, the same being adjustably held in position by set screw 33.

Journaled in suitable bearings 34, upon instrument board 35, is a rock shaft 36, provided at its inner end with relatively fixed operating levers 37, and at its opposite projecting end with a crank 38 keyed to and moving with said rock shaft, the outer end of said crank 38 being pivotally joined to the vertical operating rod 32 by means of an adjustable coupling 39, as best shown by Fig. 3 of the drawings.

The foregoing being a description of my invention in one operative form of construction, its use and operation may be briefly set forth as follows:

Applied to opposite sides of a wind-shield, as shown, the normal or vertical position of both signals is as indicated at the right of Fig. 1, this being the left side of the vehicle.

It is further provided that both glasses 24 of said lantern 22, positioned at the left side of the vehicle, may be colored red, thereby conforming to the distinguishing colors universally used and understood by mariners, red on the port and green on the starboard side of the vessel.

When in the normal or vertical position, as indicated by Figs. 2, 3 and 4, it will be observed that the electric switch between joint members 8 and 15, consisting of terminals 12, 12, and contacts 17, 18, is disconnected as shown by Fig. 4 of the drawings, at which time lanterns 22 and 22 are not illuminated.

If now it is desired and intended to turn to the right, operating lever 37 is manually elevated by agency of the hand or foot of the driver, causing a rotation of rock shaft 36, and through connections 38, 39, 32 and 31, a partial rotation of the movable member 15 of the joint coupling formed by the last mentioned member and the coöperating member 8. As a consequence, one lantern 22, with its green lights 24, is projected into a horizontal position, as shown at one side of Fig. 1, electrical connections being thereby established between switch members 12, 12, and 17, 18, thus lighting that particular lamp 25, and clearly indicating to pedestrians and others, both in front and in rear of the vehicle, that it is about to be turned to the right. This turn having been negotiated, the said lantern 22, is again returned to its normal vertical position by a reversal of the operation stated.

Obviously, when a turn is to be made to the left, the aforesaid operation is repeated on the left or opposite side of the vehicle, where the red light of lantern 22 is employed to indicate, as before, a turn in that direction. In like manner, either or both signal lanterns may be employed simultaneously or dissimultaneously, in a variety of ways, to execute as many agreed and understood road and traffic signals, and to these ends, the invention having been hereinbefore described, what I now claim and desire to secure by Letters Patent, is:

An indicating device for vehicles comprising a supporting bracket extending laterally from the vehicle, a signal, a signal arm adapted to move laterally in the arc of a circle from a normally vertical to a horizontal position having an enlarged joint member pivoted upon said bracket, a vertically movable signal operating rod eccentrically pivoted upon said joint member, a horizontally arranged actuating rock shaft, a crank pivotally connecting said shaft and operating rod, a manipulating lever fixed upon said rock shaft, and means for automatically illuminating said signal when in a horizontal position.

In testimony whereof I affix my signature in presence of two subscribing witnesses.

JOSEPH B. MERWIN.

Witnesses:
 E. S. N. PARKER,
 O. M. GUNNELL.